(12) United States Patent
Kim

(10) Patent No.: US 8,624,672 B2
(45) Date of Patent: Jan. 7, 2014

(54) INTEGRATED CIRCUIT

(75) Inventor: Kwan-Dong Kim, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 70 days.

(21) Appl. No.: 13/333,766

(22) Filed: Dec. 21, 2011

(65) Prior Publication Data

US 2012/0268207 A1    Oct. 25, 2012

(30) Foreign Application Priority Data

Apr. 25, 2011    (KR) .................. 10-2011-0038474

(51) Int. Cl.
*H03F 3/45*    (2006.01)
(52) U.S. Cl.
USPC .......................... 330/260; 330/258; 330/261

(58) Field of Classification Search
USPC .................................................. 330/252–261
See application file for complete search history.

(56) References Cited

U.S. PATENT DOCUMENTS 7,894,727 B2 * 2/2011 Inoue ........................... 398/202
7,999,612 B2 * 8/2011 Hsieh .............................. 330/69

\* cited by examiner

*Primary Examiner* — Hieu Nguyen
(74) *Attorney, Agent, or Firm* — IP & T Group LLP

(57) ABSTRACT

An integrated circuit includes an input unit and a voltage level detecting unit. The input unit is configured to output differential amplification signals corresponding to differential input signals in response to a voltage level detection signal. The voltage level detecting unit is configured to detect a voltage level of the differential amplification signals and output the voltage level detection signal.

18 Claims, 7 Drawing Sheets

INTEGRATED CIRCUIT

CROSS-REFERENCE TO RELATED APPLICATIONS

The present application claims priority of Korean Patent Application No. 10-2011-0038474, filed on Apr. 25, 2011, which is incorporated herein by reference in its entirety.

BACKGROUND

1. Field

Exemplary embodiments of the present invention relate to semiconductor design technology, and more particularly, to an input circuit for inputting signals.

2. Description of the Related Art

As an operating frequency of a chip including integrated circuits increases, an inter-chip interface scheme is being developed for high bandwidth and low power consumption thereof. Examples of general interface scheme include an interface scheme using AC Coupled Interconnection (ACCI) for high bandwidth and low power consumption and an interface scheme using a Current Mode Logic (CML)-type driver for high-speed operation.

FIG. 1 is a diagram illustrating an interface scheme using AC Coupled Interconnection (ACCI).

Referring to FIG. 1, an ACCI (AC Coupled Interconnection)-based interface scheme means a capacitive coupled input/output (I/O) circuit having a capacitor connected to a channel. In particular, a transmitter (TX) uses a voltage mode driver for power saving, and an output stage of the transmitter (TX) includes an impedance matching resistor for removing the influence of signal reflection. The ACCI-based interface scheme has band-pass characteristics of filtering off a DC component and passing an AC component and has a function of converting a Non-Return to Zero (NRZ) signal into a Return to Zero (RZ) signal.

FIG. 2 is a diagram illustrating an interface scheme using a Current Mode Logic (CML)-type driver.

Referring to FIG. 2, as compared to an ACCI (AC Coupled Interconnection)-based interface scheme, an interface scheme using a Current Mode Logic (CML)-type driver may provide a high-speed operation due to the CML-type driver.

However, the interface scheme using a CML-type driver has the following features.

The interface scheme using a CML-type driver has the features of duty cycle amplification causing the duty ratio of differential input signals (IN+, IN−) to be distorted while passing a channel, and it may be susceptible to a common mode noise. Here, the common mode noise means the phenomenon that a common mode voltage level of a differential signal swings and fails to maintain a target level.

Also, the interface scheme using a CML-type driver has the features of generating constant power consumption along a current path (P1, P2) when a differential signal is transmitted through a channel, as illustrated in FIG. 2.

SUMMARY

An embodiment of the present invention is directed to an integrated circuit (IC) that is capable of providing stable operations against a common mode noise while minimizing a distortion of a duty ratio of a differential input signal.

Another exemplary embodiment of the present invention are directed to an IC that is capable of minimizing undesirable power consumption while providing a high-speed operation.

In accordance with an exemplary embodiment of the present invention, an integrated circuit includes an input unit configured to output differential amplification signals corresponding to differential input signals in response to a voltage level detection signal, and a voltage level detecting unit configured to detect a voltage level of the differential amplification signals and output the voltage level detection signal.

In accordance with another exemplary embodiment of the present invention, an integrated circuit includes a bias generating unit comprising a bias unit disposed between a high power supply voltage terminal and a first common node to change a DC level of differential input signals and output differential bias signals, and a first current source disposed between the first common node and a low power supply voltage terminal, a differential amplifying unit comprising a differential input unit configured to selectively connect a second common node and differential output terminals in response to the differential bias signals, a loading unit configured to supply a high power supply voltage to the differential output terminals in response to a voltage level detection signal, and a second current source disposed between the second common node and the low power supply voltage terminal, and a voltage level detecting unit comprising a sampling unit configured to sample voltage levels of the differential output terminals, and a voltage level detection signal generating unit configured to generate the voltage level detection signal in response to an enable signal and an output signal of the sampling unit.

In accordance with yet another exemplary embodiment of the present invention, an integrated circuit includes an input unit configured to input first Return to Zero (RZ)-type differential signals in response to a voltage level detection signal, a voltage level detecting unit configured to detect a voltage level of second RZ-type differential signals outputted from the input unit and output the voltage level detection signal, and a first signal converting unit configured to output first Non-Return to Zero (NRZ)-type differentials signal corresponding to the second RZ-type differential signals.

DETAILED DESCRIPTION

Figure 1:
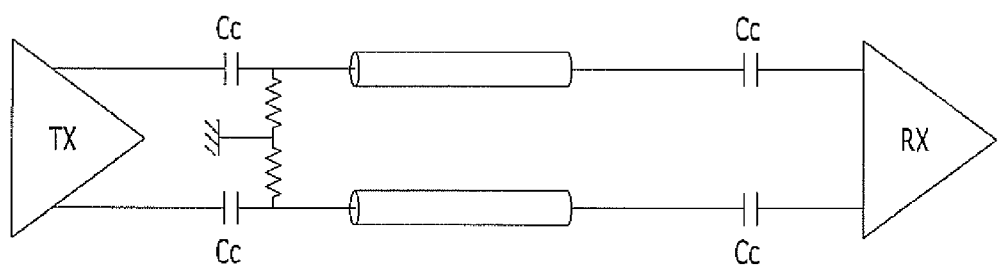
FIG. 1 is a diagram illustrating a conventional interface scheme using AC Coupled Interconnection (CCI).
Figure 2:
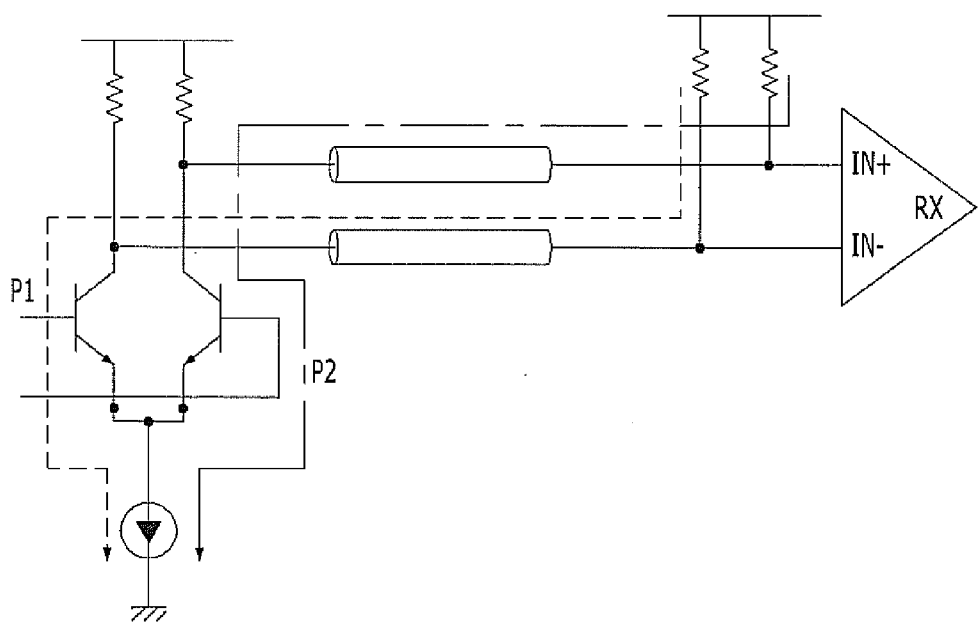
FIG. 2 is a diagram illustrating a conventional interface scheme using a Current Mode Logic (CML)-type driver.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 3:
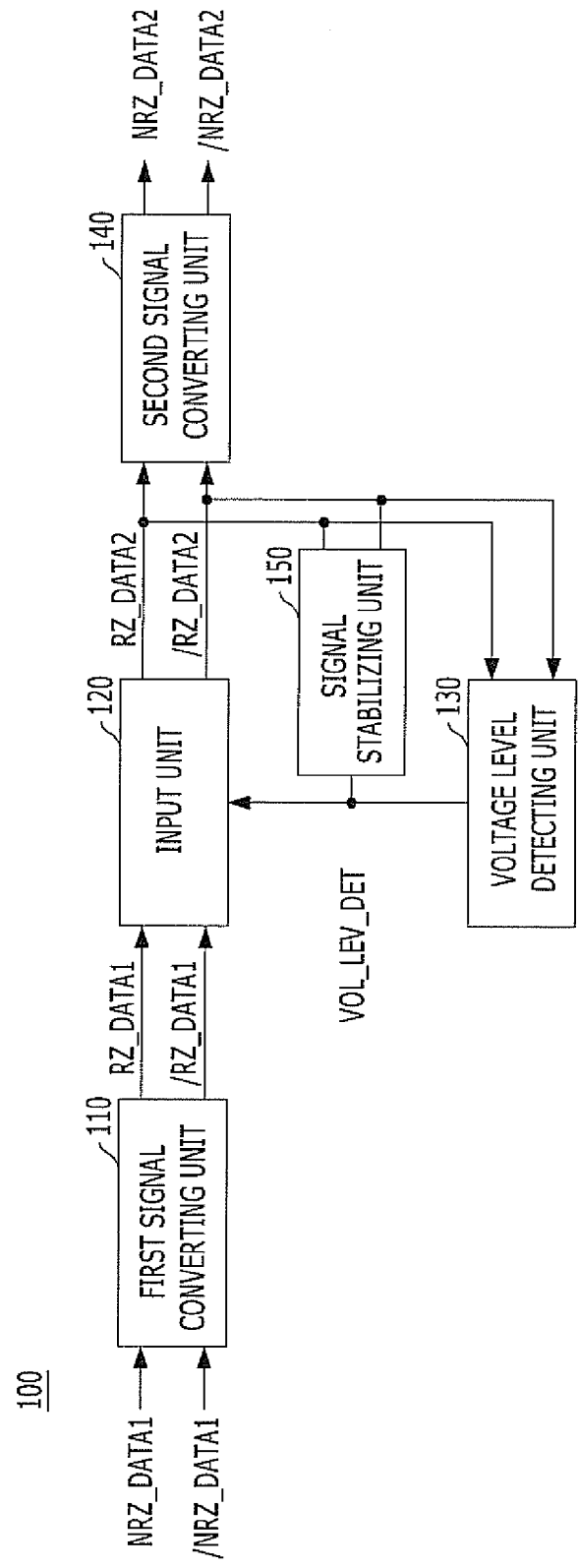
FIG. 3 is a block diagram of a semiconductor IC in accordance with an exemplary embodiment of the present invention.

FIG. 3 is a block diagram of a semiconductor IC in accordance with an embodiment of the present invention.

Referring to FIG. 3, a semiconductor IC 100 in accordance with an embodiment of the present invention includes a first signal converting unit 110 configured to convert first external NRZ (Non-Return to Zero)-type differential signals NRZ_DATA1 and /NRZ_DATA1 into first RZ (Return to Zero)-type differential signals RZ_DATA1 and /RZ_DATA1, an input unit 120 configured to input the first RZ-type differential signals RZ_DATA1 and /RZ_DATA1 in response to a voltage level detection signal VOL_LEV_DET, a voltage level detecting unit 130 configured to detect a voltage level of second RZ-type differential signals RZ_DATA2 and /RZ_DATA2 outputted from the input unit 120 and output the voltage level detection signal VOL_LEV_DET, a second signal converting unit 140 configured to output second NRZ-type differential signals NRZ_DATA2 and /NRZ_DATA2 corresponding to the second RZ-type differential signals RZ_DATA2 and /RZ_DATA2, and a signal stabilizing unit 150 provided between an output terminal of the voltage level detecting unit 130 and differential output terminals of the input unit 120 to stabilize the voltage level detection signal VOL_LEV_DET. Here, the NRZ-type signal means a signal that is activated from a logic low level (zero) to a logic high level and maintains a logic high level during one cycle. The RZ-type signal means a signal that is activated from a logic low level (zero) to a logic high level, maintains a logic high level only in an initial period of one cycle, and returns to a logic low level (zero) in the remaining period of one cycle.

Figure 4:
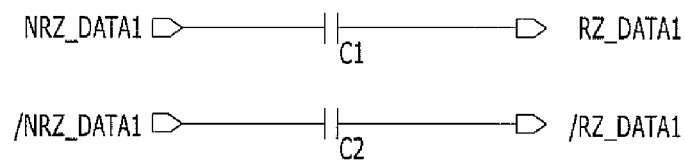
FIG. 4 is a diagram illustrating an example of a first signal converting unit illustrated in FIG. 3.

FIG. 4 is a diagram illustrating an example of the first signal converting unit 110 illustrated in FIG. 3.

Referring to FIG. 4, the first signal converting unit 110 includes a capacitor C1/C2 for each signal line. The capacitor C1/C2 filters off a DC component and passes only an AC component. Accordingly, the first NRZ-type differential signals NRZ_DATA1 and /NRZ_DATA1 are converted into the first RZ-type differential signals RZ_DATA1 and /RZ_DATA1 while passing the capacitors C1 and C2.

Figure 5:
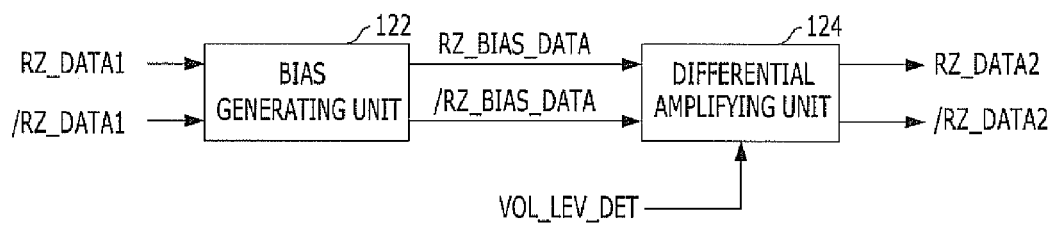
FIG. 5 is a block diagram illustrating an example of an input unit illustrated in FIG. 3.

FIG. 5 is a block diagram illustrating an example of the input unit 120 illustrated in FIG. 3.

Referring to FIG. 5, the input unit 120 includes a bias generating unit 122 configured to change a common mode voltage level of the first RZ-type differential signals RZ_DATA1 and /RZ_DATA1 and generate RZ-type differential bias signals RZ_BIAS_DATA and /RZ_BIAS_DATA, and a differential amplifying unit 124 configured to amplify the RZ-type differential bias signals RZ_BIAS_DATA and /RZ_BIAS_DATA to a predetermined voltage level in response to the voltage level detection signal VOL_LEV_DET and output the second RZ-type differential signals RZ_DATA2 and /RZ_DATA2. Here, the differential amplifying unit 124 may include an NMOS-type amplifying unit.

Figure 6:
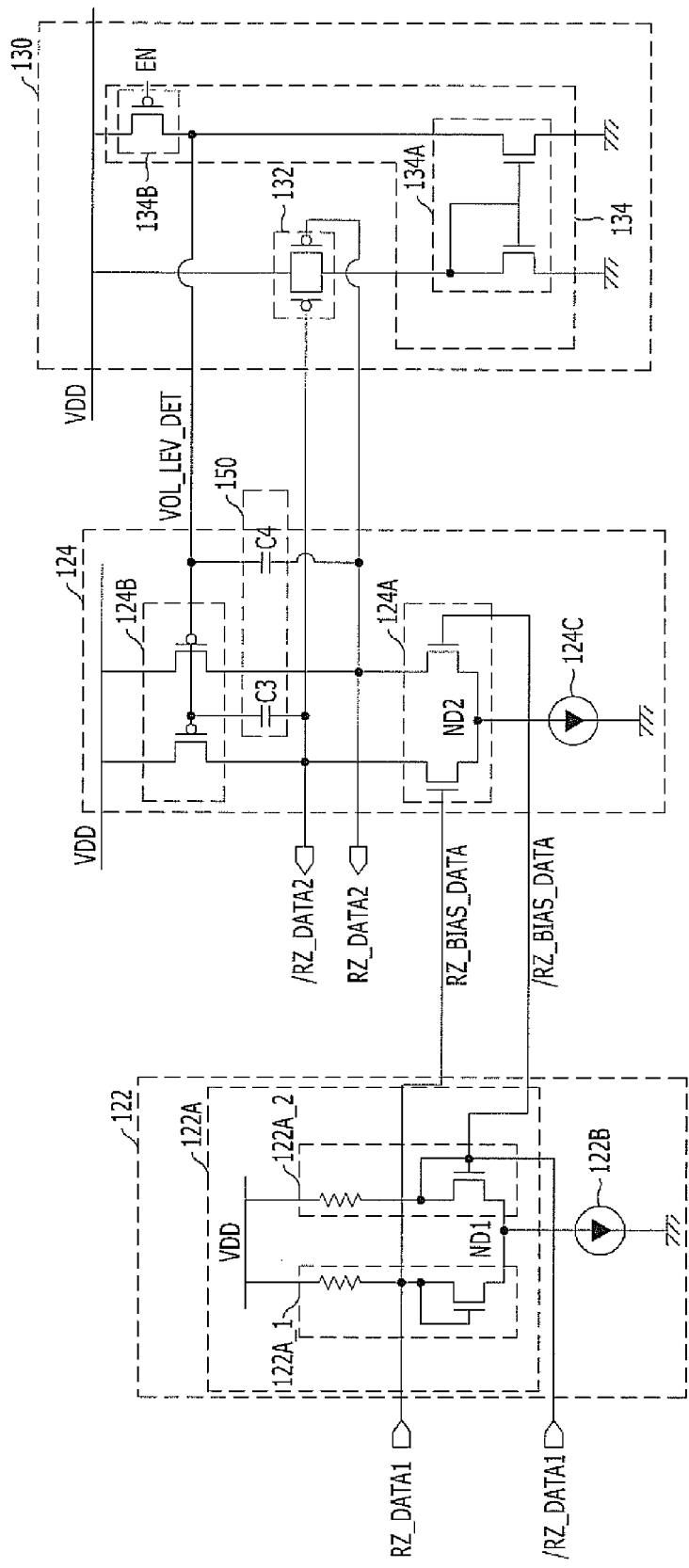
FIG. 6 is a circuit diagram illustrating a circuit including an input unit, a voltage level detecting unit and a signal stabilizing unit illustrated in FIG. 3.

FIG. 6 is a circuit diagram illustrating the bias generating unit 122 and the differential amplifying unit 124 of FIG. 5 and the voltage level detecting unit 130 and the signal stabilizing unit 150 of FIG. 3.

Referring to FIG. 6, the bias generating unit 122 includes a bias unit 122A disposed between a high power supply voltage (VDD) terminal and a first common node ND1 to add a DC level to the first RZ-type differential signals RZ_DATA1 and /RZ_DATA1 with an AC level, and a first current source 122B disposed between the first common node ND1 and a low power supply voltage (VSS) terminal.

The bias unit 122A includes a first bias unit 122A_1 disposed between the high power supply voltage (VDD) terminal and the first common node ND1 to generate a DC-level bias voltage and add the DC-level bias voltage to one (RZ_DATA1) of the first RZ-type differential signals RZ_DATA1 and /RZ_DATA1, and a second bias unit 122A_2 disposed in parallel to the first bias unit 122A_1 to generate a DC-level bias voltage and add the DC-level bias voltage to the other (/RZ_DATA1) of the first RZ-type differential signals RZ_DATA1 and /RZ_DATA1. The first and second bias units 122A_1 and 122A_2 are configured to divide a voltage applied between the high power supply voltage VDD and the low power supply voltage VSS and generate a DC-level bias voltage. The generated DC-level bias voltage may have such a level as to turn on an NMOS transistor included in a differential input unit 124A of the differential amplifying unit 124, which will be described below.

The differential amplifying unit 124 includes a differential input unit 124A configured to selectively connect a second common node ND2 and an output terminal of the second RZ-type differential signals RZ_DATA2 and /RZ_DATA2 in response to the RZ-type differential bias signals RZ_BIAS_DATA and /RZ_BIAS_DATA, a loading unit 124B configured to supply the high power supply voltage VDD to an output terminal of the second RZ-type differential signals RZ_DATA2 and /RZ_DATA2 in response to the voltage level detection signal VOL_LEV_DET, and a second current source 124C disposed between the second common node ND2 and the low power supply voltage (VSS) terminal.

The voltage level detecting unit 130 may include a Common Mode FeedBack (CMFB) circuit. For example, the voltage level detecting unit 130 includes a sampling unit 132 configured to sample/detect a voltage level of the output terminal of the second RZ-type differential signals RZ_DATA2 and /RZ_DATA2, and a voltage level detection signal generating unit 134 configured to generate the voltage level detection signal VOL_LEV_DET in response to a bias signal EN and an output signal of the sampling unit 132. The voltage level detection signal generating unit 134 includes a first voltage supplying unit 134A configured to have a current mirror-type structure and supply the low power supply voltage VSS to an output terminal of the voltage level detection signal VOL_LEV_DET in response to the output signal of the sampling unit 132, and a second voltage supply unit 134B configured to supply the high power supply voltage VDD to the output terminal of the voltage level detection signal VOL_LEV_DET in response to the bias signal EN.

The signal stabilizing unit 150 includes capacitors C3 and C4 disposed in parallel between the output terminal of the voltage level detecting unit 130 and the differential output terminal of the differential amplifying unit 124. The capacitors C3 and C4 function to stabilize the voltage level detection signal VOL_LEV_DET.

Figure 7:
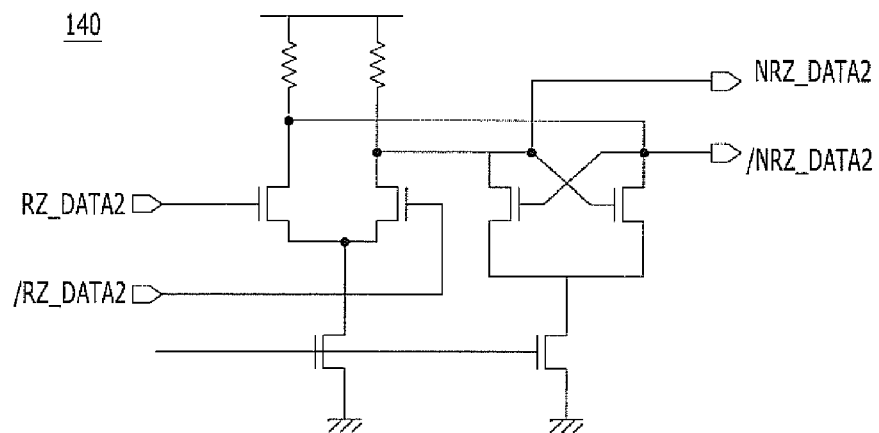
FIG. 7 is a circuit diagram illustrating an example of a second signal converting unit illustrated in FIG. 3.

FIG. 7 is a circuit diagram illustrating an example of the second signal converting unit 140 illustrated in FIG. 3.

Referring to FIG. 7, the second signal converting unit 140 includes a CML-type latch circuit. The second signal converting unit 140 latches the second RZ-type differential signals RZ_DATA2 and /RZ_DATA2 and outputs the second NRZ-type differential signals RZ_DATA2 and /RZ_DATA2. The CML-type latch circuit is well known in the art, and thus a detailed description thereof is omitted for the purpose of description.

Hereinafter, an operation of the semiconductor IC 100 in accordance with an embodiment of the present invention will be described with reference to FIGS. 8A to 8E.

FIGS. 8A to 8E are timing diagrams illustrating an operation of a semiconductor IC 100 in accordance with an embodiment of the present invention.

Figure 8A:
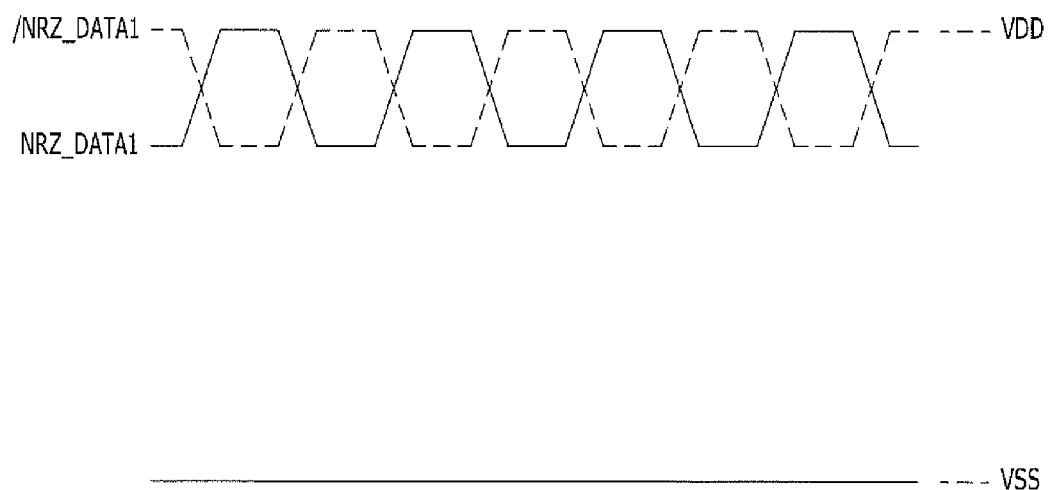
FIGS. 8A to 8E are timing diagrams illustrating an operation of a semiconductor IC in accordance with an exemplary embodiment of the present invention.
Figure 8B:
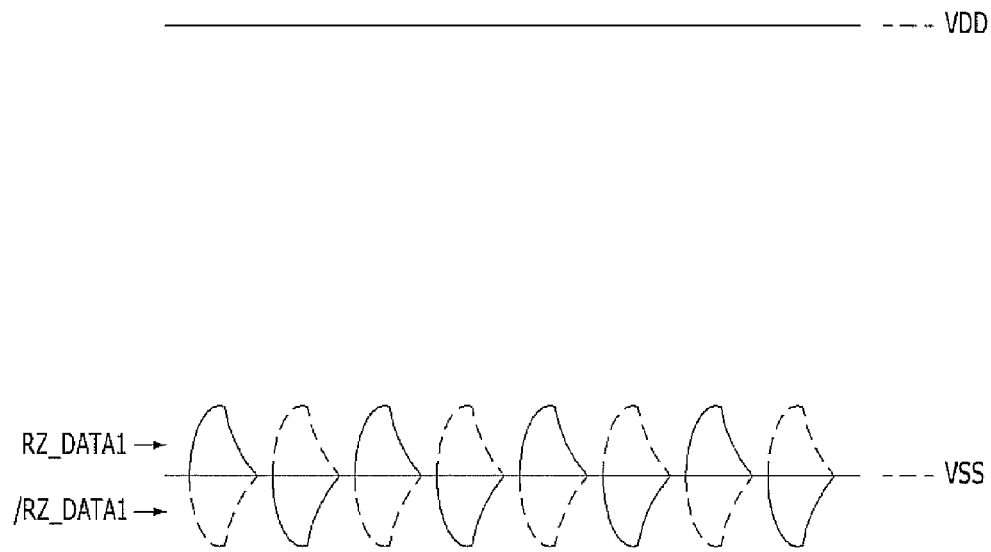

Referring to FIGS. 8A and 8B, when the first NRZ-type differential signals NRZ_DATA1 and /NRZ_DATA1 having a common mode voltage level close to the high power supply voltage VDD are applied from the outside, they are converted into the first RZ-type differential signals RZ_DATA1 and /RZ_DATA1 having a common mode voltage level of the low power supply voltage VSS while passing the first signal converting unit 110. At this point, a distortion of the duty ratio of the first RZ-type differential signals RZ_DATA1 and /RZ_DATA1 is minimized due to the nature of the RZ-type signal. Accordingly, the semiconductor IC 100 in accordance with an embodiment of the present invention may be suitably used as a circuit that receives differential signals such as inverting and non-inverting clock signals CLK and /CLK, the duty ratio of which is one of the important factors. However, the present invention is not limited thereto, and the semiconductor IC 100 may also be applicable to any circuit that receives data, command, and address signals.

Figure 8C:
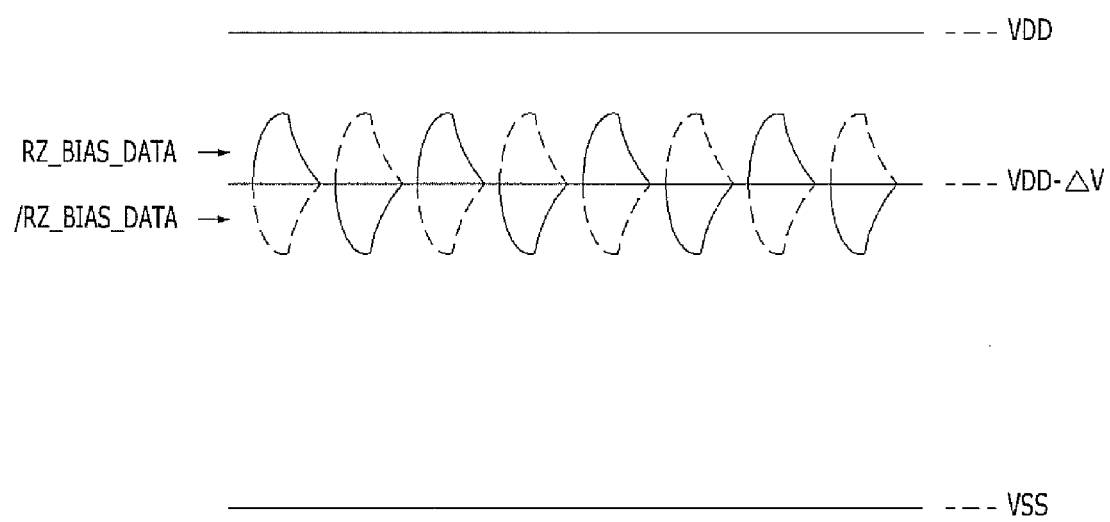

Referring to FIG. 8C, when the first RZ-type differential signals RZ_DATA1 and /RZ_DATA1 are inputted into the bias generating unit 122, the bias generating unit 122 adds a bias voltage VDD-ΔV of a predetermined DC level to a common mode voltage of the first RZ-type differential signals RZ_DATA1 to output the RZ-type differential bias signals RZ_BIAS_DATA and /RZ_BIAS_DATA having the bias voltage VDD-ΔV as a common mode voltage.

Figure 8D:
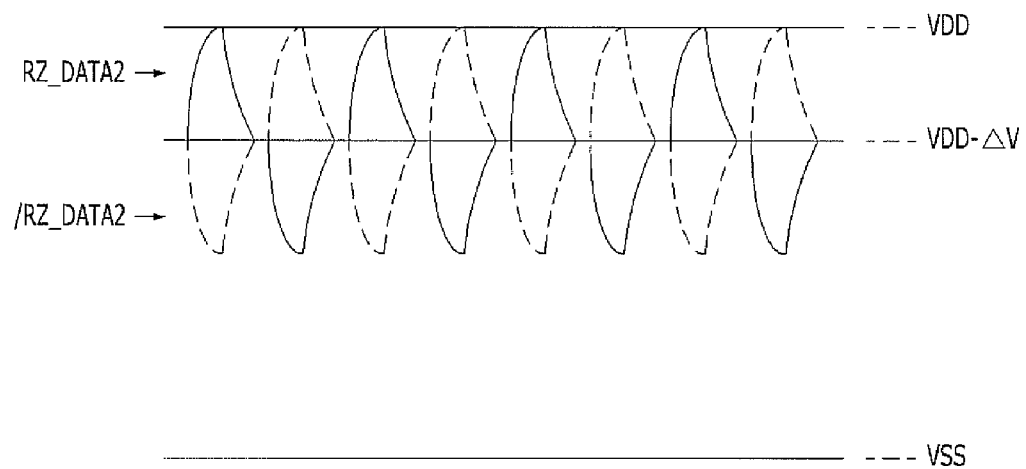

Referring to FIG. 8D, when the RZ-type differential bias signals RZ_BIAS_DATA and /RZ_BIAS_DATA are inputted into the differential amplifying unit 124, the differential amplifying unit 124 amplifies the RZ-type differential bias signals RZ_BIAS_DATA and /RZ_BIAS_DATA and outputs the second RZ-type differential signals RZ_DATA2 and /RZ_DATA2.

The voltage level detecting unit 130 samples a voltage level of the second RZ-type differential signals RZ_DATA2 and /RZ_DATA2 and feeds back the sampling result as the voltage level detection signal VOL_LEV_DET to the differential amplifying unit 124. That is, when the common mode voltage level of the second RZ-type differential signals RZ_DATA2 and /RZ_DATA2 swings, the voltage level detecting unit 130 compensates for this. For example, when the common mode voltage level of the RZ-type differential bias signals RZ_BIAS_DATA and /RZ_BIAS_DATA becomes higher than the bias voltage VDD-ΔV, the common mode voltage level of the second RZ-type differential signals RZ_DATA2 and /RZ_DATA2 becomes lower. In this case, since the voltage level detecting unit 130 detects this (i.e., a PMOS transistor of the sampling unit 132 is turned on) and outputs the voltage level detection signal VOL_LEV_DET of a logic low level, the loading unit 124B supplies the high power supply voltage VDD to the output terminal of the second RZ-type differential signals RZ_DATA2 and /RZ_DATA2 in response to the voltage level detection signal VOL_LEV_DET of a logic low level, thereby compensating for the lowered common mode voltage level of the second RZ-type differential signals RZ_DATA2 and /RZ_DATA2. Accordingly, even when the common mode voltage level of the RZ-type differential bias signals RZ_BIAS_DATA and /RZ_BIAS_DATA swings, the common mode voltage level of the second RZ-type differential signals RZ_DATA2 and /RZ_DATA2 maintains a predetermined constant bias voltage (VDD-ΔV) level.

Figure 8E:
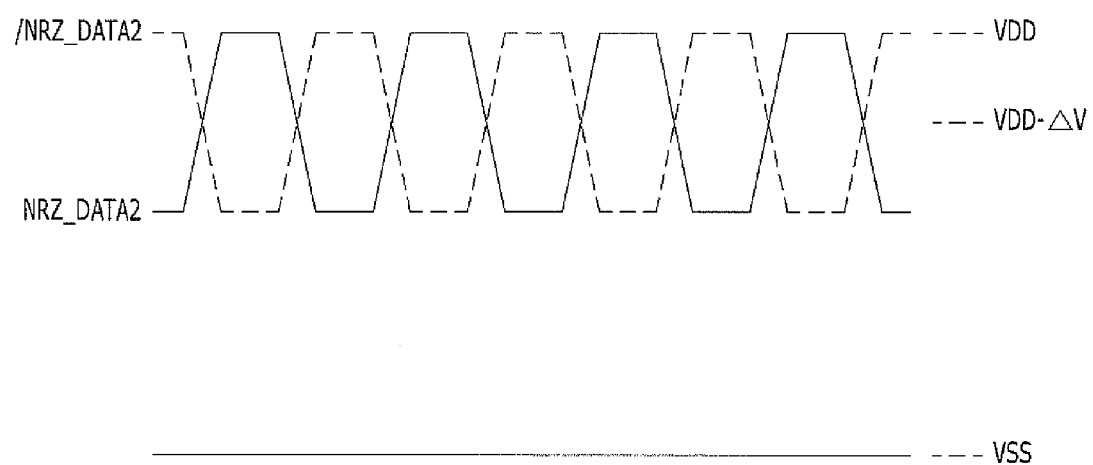

Referring to FIG. 8E, when the second RZ-type differential signals RZ_DATA2 and /RZ_DATA2 are inputted into the second signal converting unit 140, the second signal converting unit 140 latches the second RZ-type differential signals RZ_DATA2 and /RZ_DATA2 and outputs the second NRZ-type differential signals NRZ_DATA2 and /NRZ_DATA2.

In accordance with the embodiments of the present invention, a distortion of the duty ratio of the differential signals may be minimized and a common mode noise in the differential signals may be minimized.

As described above, the present invention uses the CMFB (Common Mode FeedBack) circuit and the signal conversion characteristics of ACCI (AC Coupled Interconnection), thereby preventing the swing of the common mode voltage level of the differential input signals while minimizing a distortion of the duty ratio of the differential input signals. The present invent may be more efficiently applied in inputting differential signals such as inverting and non-inverting clock signals CLK and /CLK, the duty ratio of which is one of the important factors.

Also, the present invention may provide a high-speed operation and minimize the power consumption by removing an element causing excess power consumption.

While the present invention has been described with respect to the specific embodiments, it will be apparent to those skilled in the art that various changes and modifications may be made without departing from the spirit and scope of the invention as defined in the following claims.

What is claimed is:

1. An integrated circuit comprising:
   an input unit configured to output differential amplification signals corresponding to differential input signals in response to a voltage level detection signal;
   a voltage level detecting unit configured to detect a voltage level of the differential amplification signals and output the voltage level detection signal; and
   a signal stabilizing unit configured to stabilize the voltage level detection signal in response to the differential amplification signals.

2. The integrated circuit of claim 1, wherein the input unit comprises:
   a bias generating unit configured to change a common mode voltage level of the differential input signals and generate differential bias signals; and
   a differential amplifying unit configured to amplify the differential bias signals of the bias generating unit to swing within a set voltage level in response to the voltage level detection signal and output the differential amplification signals.

3. The integrated circuit of claim 1, wherein the voltage level detecting unit comprises a Common Mode FeedBack (CMFB) circuit.

4. An integrated circuit comprising:
   a bias generating unit comprising a bias unit disposed between a high power supply voltage terminal and a first common node to change a DC level of differential input signals and output differential bias signals, and a first current source disposed between the first common node and a low power supply voltage terminal;
   a differential amplifying unit comprising a differential input unit configured to selectively connect a second common node and differential output terminals in response to the differential bias signals, a loading unit configured to supply a high power supply voltage to the differential output terminals in response to a voltage level detection signal, and a second current source disposed between the second common node and the low power supply voltage terminal; and a voltage level detecting unit comprising a sampling unit configured to sample voltage levels of the differential output terminals, and a voltage level detection signal generating unit configured to generate the voltage level detection signal in response to an enable signal and an output signal of the sampling unit.

5. The integrated circuit of claim 4, further comprising:
a first signal stabilizing unit disposed between one of the differential output terminals and an output terminal of the voltage level detection signal to perform signal stabilization; and
a second signal stabilizing unit disposed between the other of the differential output terminals and the output terminal of the voltage level detection signal to perform signal stabilization.

6. The integrated circuit of claim 4, wherein the bias unit comprises:
a first bias unit disposed between the high power supply voltage terminal and the first common node to generate a DC-level bias voltage and add the DC-level bias voltage to the DC level of one of the differential input signals; and
a second bias unit disposed in parallel to the first bias unit to generate the DC-level bias voltage and add the DC-level bias voltage to the DC level of the other of the differential input signals.

7. The integrated circuit of claim 4, wherein the voltage level detection signal generating unit comprises:
a first voltage supplying unit configured to supply a low power supply voltage to an output terminal of the voltage level detection signal in response to the output signal of the sampling unit; and
a second voltage supply unit configured to supply the high power supply voltage to the output terminal of the voltage level detection signal in response to the enable signal.

8. The integrated circuit of claim 7, wherein the first voltage supplying unit has a current mirror-type structure.

9. An integrated circuit comprising:
an input unit configured to input first Return to Zero (RZ)-type differential signals in response to a voltage level detection signal;
a voltage level detecting unit configured to detect a voltage level of second RZ-type differential signals outputted from the input unit and output the voltage level detection signal; and
a first signal converting unit configured to output first Non-Return to Zero (NRZ)-type differential signals corresponding to the second RZ-type differential signals; and
a signal stabilizing unit disposed between an output terminal of the voltage level detecting unit and an output terminal of the differential amplifying unit to perform signal stabilization.

10. The integrated circuit of claim 9, further comprising a second signal converting unit configured to convert second NRZ-type differential signals into the first RZ-type differential signals.

11. The integrated circuit of claim 10, wherein the second signal converting unit comprises a capacitor.

12. The integrated circuit of claim 9, wherein the input unit comprises:
a bias generating unit configured to change a common mode voltage level of the first RZ-type differential signals; and a differential amplifying unit configured to amplify an output signal of the bias generating unit to have a set voltage level in response to the voltage level detection signal and output the second RZ-type differential signals.

13. The integrated circuit of claim 12, wherein the bias generating unit comprises:
a bias unit disposed between a high power supply voltage terminal and a first common node to add a DC level to the common mode voltage level of the first RZ-type differential signals; and
a first current source disposed between the first common node and a low power supply voltage terminal,
wherein the bias unit comprises:
a first bias unit disposed between the high power supply voltage terminal and the first common node to generate a DC-level bias voltage and add the DC-level bias voltage to the common mode voltage level of one of the first RZ-type differential signals; and
a second bias unit disposed in parallel to the first bias unit to generate the DC-level bias voltage and add the DC-level bias voltage to the common mode voltage level of the other of the first RZ-type differential signals.

14. The integrated circuit of claim 12, wherein the differential amplifying unit comprises an NMOS-type amplifying unit.

15. The integrated circuit of claim 13, wherein the differential amplifying unit comprises:
a differential input unit configured to selectively connect a differential output terminal and a second common node in response to the output signal of the bias generating unit;
a loading unit configured to supply a high power supply voltage to the differential output terminal in response to the voltage level detection signal; and
a second current source disposed between the second common node and the low power supply voltage terminal.

16. The integrated circuit of claim 9, wherein the voltage level detecting unit comprises a Common Mode FeedBack (CMFB) circuit.

17. The integrated circuit of claim 16, wherein the voltage level detecting unit comprises:
a sampling unit configured to detect the voltage level of second RZ-type differential signals; and
a voltage level detection signal generating unit configured to generate the voltage level detection signal in response to an enable signal and an output signal of the sampling unit,
wherein the voltage level detection signal generating unit comprises:
a first voltage supplying unit having a current mirror-type structure and configured to supply a low power supply voltage to an output terminal of the voltage level detection signal in response to the output signal of the sampling unit; and
a second voltage supply unit configured to supply a high power supply voltage to the output terminal of the voltage level detection signal in response to the enable signal.

18. The integrated circuit of claim 9, wherein the first signal converting unit comprises a Current Mode Logic (CML)-type latch circuit.

* * * * *